(12) United States Patent
Vaughn et al.

(10) Patent No.: US 6,342,129 B1
(45) Date of Patent: Jan. 29, 2002

(54) PROCESS FOR PRODUCTION OF CARBONACEOUS CHARS HAVING CATALYTIC ACTIVITY

(75) Inventors: Robert H. Vaughn, Bethel Park; Keith R. Nicholson, Munhall, both of PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

(21) Appl. No.: 09/079,424

(22) Filed: May 14, 1998

(51) Int. Cl.⁷ .............................................. C01B 31/02
(52) U.S. Cl. ............................ 204/157.47; 423/445 R; 502/423
(58) Field of Search ...................... 502/423; 423/445 R; 204/157.47; 205/555

(56) References Cited

U.S. PATENT DOCUMENTS

| | | | |
|---|---|---|---|
| 4,052,292 A | * 10/1977 | Espenscheid et al. | .......... 208/8 |
| 5,488,023 A | * 1/1996 | Gadkara et al. | ............. 502/182 |
| 5,733,515 A | * 3/1998 | Doughty et al. | ............. 423/210 |

* cited by examiner

Primary Examiner—Stuart L. Hendrickson
(74) Attorney, Agent, or Firm—Cohen & Grisby, P.C.

(57) ABSTRACT

A process is provided for the production of a catalytically-active carbonaceous char. By this process, a nitrogen-containing compound is combined with an uncarbonized nitrogen-poor carbon-containing material. The resulting mixture is then carbonized and oxidized at temperatures less than 600° C. The resulting low-temperature char is next heated to temperatures greater than 600° C. and subsequently activated with $H_2O$, $CO_2$, or $O_2$, singly or in any combination, to result in the catalytically-active carbonaceous char. The resulting catalytically-active carbonaceous char has utility for the chemical conversion of peroxides, hydrides, $SO_x$, $NO_x$, and chloramines in liquid and/or gaseous media.

22 Claims, No Drawings

PROCESS FOR PRODUCTION OF CARBONACEOUS CHARS HAVING CATALYTIC ACTIVITY

FIELD OF THE INVENTION

The present invention relates to a process for the production of a catalytically-active carbonaceous char, and in particular to a catalytically active char produced at low temperatures and activated at high temperature.

BACKGROUND OF THE INVENTION

The use of carbonaceous chars as catalysts in chemical reactions is well known. Applications that use catalytic chars to improve reaction rate include, but are not limited to $NO_x$ reduction, $SO_x$ oxidation, chloramine removal, glyphosate production, peroxide destruction, and metalloid and non-metalloid hydride oxidation. In many of these applications the rate of reaction can be limited by the catalytic activity of the char.

The known techniques for increasing the catalytic activity of carbonaceous chars can generally be categorized into three approaches. One approach involves treating a high-temperature carbonaceous char after the completion of the thermal processing used to produce the char. High temperature thermal processing is usually conducted at temperatures equal to or greater than 700° C. to produce a high-temperature char such as an activated carbon or charcoal. Chars produced at temperatures below 700° C. are referred to as low-temperature chars. In one example of this prior art, a high temperature char is impregnated with metal ions to improve the catalytic performance of the char in $NO_x$ removal applications. It is also known that exposing activated carbon to ammonia in an oxidizing environment increases the catalytic activity of the carbon. Similarly, oxidizing an activated carbon, followed by inert heat treatment to drive off the oxygen-containing groups from the surface of the carbon enhances the catalytic performance in $SO_2/SO_3$ conversion. It is known furthermore that catalytic oxidative activity of an activated carbon is improved by first oxidizing the carbon and then heating the oxidized carbon in the presence of nitrogen-containing compounds such as urea or melamine.

A second approach process for increasing the catalytic activity of carbonaceous chars provides a the carbonaceous feedstock which is thermally processed to produce the chars. Those skilled in the art are aware that the catalytic activity is affected by the nitrogen content of the feedstock. For example, pure nitrogen-rich compounds such as hexamethylenetetramine, polyacrylnitrile, and gelatin will, when carbonized and activated, produce carbonaceous chars with catalytic activity. Additionally, admixing ammonium salts with inherently nitrogen-poor feedstock, followed by carbonizing and activating, is known to improve $NO_x$ reduction performance of the char beyond what is achieved without the addition of the ammonium salts. Similar improvements in the decomposition of hydrogen peroxide are realized with a char made by admixing a nitrogen-containing compound such as urea with a nitrogen-poor feedstock such as sucrose prior to carbonizing and activating.

A more recent approach for increasing the catalytic activity of carbonaceous chars involves modifications to the thermal processes used to produce the chars. Catalytic activity has been significantly enhanced by carbonization and oxidation of a nitrogen-poor bituminous material followed by impregnation of the resultant low-temperature char with a nitrogen-containing compound prior to or during exposure of the char to temperatures of 700°C. or greater. The resultant high-temperature carbonaceous char may then be activated to the desired degree by any known technique. In this approach, the benefit of extensive oxidation of the carbonized product prior to impregnation with a nitrogen-containing compound is taught.

The relative catalytic activity of carbonaceous chars has been shown to be accurately and conveniently classified by determining the ability of the chars to catalyze the decomposition of hydrogen peroxide in an aqueous solution, as set forth in U.S. Pat. No. 5,470,748 (1995). The decomposition reaction is exothermic and, therefore, causes an increase in the temperature of the solution. Under a defined set of conditions, the elapsed time to achieve 75% of the temperature change resulting from complete decomposition of the hydrogen peroxide, or "t-¾ time", depends solely on the ability of a char to catalyze the hydrogen peroxide decomposition reaction. For instance, two chars may exhibit similar physical absorptive capacity measured in terms of the Iodine Number, for example, yet have significantly different t-¾ times. Iodine Number is described in test method TM4 of Calgon Carbon Corporation, Pittsburgh, Pa., and is an indication of the available $m^2/g$ surface area of the char. Chars having low t-¾ values are known to be useful for $NO_x$ reduction, $SO_2$ oxidation, chloramine removal, glyphosate production, peroxide destruction, and metalloid and non-metalloid hydride oxidation.

Thus, it is known that the peroxide decomposition ability of char made from a nitrogen-poor carbonaceous feedstock can be improved by combining said feedstock with nitrogen-containing compounds prior to thermal processing. It is also known that carbonizing a nitrogen-poor carbonaceous feedstock under an oxidizing environment, followed by impregnating the oxidized carbonized product with a nitrogen-containing compound, will enhance peroxide decomposition ability of the final activated char. However, it is not taught by, nor can it be inferred from, the prior art that combining a nitrogen-rich compound with a nitrogen-poor carbonaceous feedstock, and then carbonizing the mixture in an oxidizing environment, will enhance the hydrogen peroxide decomposition ability of the final activated char beyond that achieved without said oxidizing environment or, conversely, without said addition of nitrogen-containing compound. The principal disadvantage expected in such a process would be the oxidation and loss of the nitrogen-containing compound prior to high-temperature treatment, and the consequent need for large amounts of these materials during processing to confer the requisite catalytic activity to the final product. If a unique and significant t-¾ benefit could derive from such a process using relatively small amounts the nitrogen-containing compound, the process would have significant cost and performance advantages over the prior art. For example, those prior art methods which rely on treatment with added metals to produce catalytic activity impose a cost burden due to special handling and disposal procedures associated with the metals. Prior art methods which rely on the use of pure nitrogen-rich compounds as feedstocks also bear a cost burden due to the high cost of the feedstock and to the hazard created by large amounts of cyanide and other toxic materials which are invariably produced during thermal processing. Furthermore, prior art processes that use high temperature chars, such as activated carbons and charcoals, as feedstocks are inherently more costly because of the additional process steps needed to confer catalytic activity to the final product.

Accordingly, it is the object of the present invention to provide an improved low-cost process for the production of low-temperature carbonaceous chars having improved catalytic activity that are made from nitrogen-poor char feedstocks without the use of added metals or post-treatments of the high temperature char. It is a further object of the present invention to provide these improved cost and performance advantages through relatively minor and low-cost modifications of both the feedstock and the processing conditions typically used to make high temperature chars.

SUMMARY OF THE INVENTION

The present invention comprises a method for the production of low-temperature carbonaceous chars having significant catalytic activity. As used herein, the term low temperature carbonaceous char includes the carbonaceous char prepared in accordance with the present invention, and which can be activated at a temperature in excess of 600° C. to produce an activated low-temperature catalytic carbonaceous char. The method includes the steps of combining relatively small amounts of a nitrogen-containing compound with a nitrogen-poor carbonaceous feedstock, carbonizing the mixture at temperatures less than 600° C. in an oxidizing environment, and then activating the resultant carbonized/oxidized product at temperatures greater than 600° C. Surprisingly, large amounts of the nitrogen-containing compound are not required to compensate for losses during the oxidation step. In fact, for a given amount of the nitrogen-containing compound, higher levels of oxidation actually confer higher levels of catalytic activity to the final product. Oxidation of the said mixture can occur during or after carbonization, and is conducted at a level that is typically well beyond the requirements of activated carbon manufacture. The resultant activated carbonaceous char has been found to have appreciable catalytic activity. Furthermore, any of the known processes or methods for production of catalytically active low-temperature carbonaceous chars can be incorporated into the present invention to further enhance the catalytic activity of the resultant char.

In practice, the amount of the nitrogen-containing compound used in the present invention is typically small, preferably less than 15% by weight of the carbon-containing material or, alternatively, an amount such that the desired level of catalytic activity is exhibited by the resultant activated catalytically active high temperature carbonaceous char.

In a preferred embodiment of the invention, the carbon containing material is coal. The nitrogen-containing compound is any organic or inorganic nitrogen containing compound having at least one nitrogen functionality in which the nitrogen exhibits an oxidation number of less than zero. Examples of such nitrogen containing compounds include urea, melamine, ammonium halides, aniline, gelatin, and polyacrylonitrile. Preferably, the components are pulverized together with a suitable binder such as pitch, if necessary or desired, and the resultant pulverized product is formed into granules, disks, spheres, pellets or like physical forms. The resultant formed material is then carbonized by heating in an oxidizing environment at temperatures less than 600° C. The resulting low-temperature carbonaceous char is then thermally activated by exposure of the char to one or more of $H_2O$, $CO_2$, or $O_2$ at temperature greater than 600° C. The duration of said exposure is selected such that the resultant activated high-temperature carbonaceous char exhibits an Iodine Number greater than 200 mg/g, where Iodine Number is determined in accordance with test method TM4 of Calgon Carbon Corporation, Pittsburgh, Pennsylvania, and is an indication of the available $m^2/g$ adsorptive surface area of the char.

In another preferred embodiment of the invention, the carbonaceous material is a coal to which less than 15% by weight of a nitrogen containing compound having at least one nitrogen functionality in which the nitrogen exhibits an oxidation number of less than zero. These materials are pulverized together with a suitable binder such as pitch, if necessary or desired, and the pulverized product is formed into granules disks, spheres, pellets or like physical forms. The resultant formed material is then carbonized by heating in an oxidizing environment at temperature less than 400° C. The resulting low-temperature carbonaceous char is then thermally activated by exposure of the char to any combination of $H_2O$, $CO_2$, or $O_2$ at temperature greater than 600° C. The duration of said exposure is selected such that the resultant activated high-temperature carbonaceous char exhibits an Iodine Number greater than 400 mg/g, where Iodine Number is determined in accordance with test method TM-4 of Calgon Carbon Corporation, Pittsburgh, Pa., and is an indication of the available $m^2/g$ adsorptive surface area of the char.

In another preferred embodiment of the invention, the carbonaceous material is a coal to which less than 5% by weight of a nitrogen containing compound having at least one nitrogen functionality in which the nitrogen exhibits an oxidation number of less than zero. These materials are pulverized together with a suitable binder such as pitch, if necessary or desired, and the pulverized product is formed into disks, spheres, pellets or like physical forms. The resultant formed material is then carbonized by heating in an oxidizing environment at temperature less than 400° C. The resulting low-temperature carbonaceous char is then thermally activated by exposure of the char to any combination of $H_2O$, $CO_2$, or $O_2$ at temperature greater than 600° C. The duration of said exposure is selected such that the resultant activated low-temperature carbonaceous char exhibits an Iodine Number greater than 600 mg/g, where Iodine Number is determined in accordance with test method TM4 of Calgon Carbon Corporation, Pittsburgh, Pa., and is an indication of the available $m^2/g$ adsorptive surface area of the char.

PRESENTLY PREFERRED EMBODIMENTS

The following examples illustrate preferred embodiments of the present invention. In general, the examples demonstrate that the present invention may be practiced with a variety of carbonaceous feedstocks and nitrogen containing compounds. Furthermore, Examples 4 and 5 illustrate the importance of oxidation during carbonization to impart, after subsequent activation, a high peroxide decomposition catalytic activity to the resultant char.

Example 1

A bituminous coal and 4 weight % pitch were pulverized and subsequently briquetted. The resultant briquettes were crushed and sized to approximately less than 6 mesh size and greater than 20 mesh size (U.S. Standard Series sieves). In the presence of large quantities of excess air, the formed and sized material was oxidized and carbonized by heating from 150° C. to 450° C. at a rate of 100° C./hour and maintaining the temperature at 450° C. for three additional hours. The oxidized carbonized product was activated at a temperature of approximately 1000° C. The resultant activated low-temperature carbonaceous char was then cooled to room temperature under inert conditions. The t-¾ time of the resultant char was then determined according to the method of Example 1 of U.S. Pat. No. 5,470,748. The Iodine Number of the same char was also determined according to Test Method number TM4, Calgon Carbon Corporation, Pittsburgh, Pa. The results of the test are provided in Table 1.

Example 2

The bituminous coal and 4% by weight pitch of Example 1 were combined with 10% by weight urea. The resultant mixture was then processed in the manner described in Example 1. The t-¾ time and Iodine Number of the resultant low-temperature activated carbonaceous char were then determined according to the test methods described in Example 1. The results are given in Table 1. As shown in Table 1, the Iodine Number of the low-temperature activated char of Example 2 is almost equal to that of Example 1 which indicates that the physical adsorption properties of both chars are very similar. Also, comparison of the t-¾ time of the low-temperature activated char of Example 2 to that of Example 1 as provided in Table 1 shows that the catalytic activity of the char of Example 2 is much greater (i.e. lower t-¾ time) than that of Example 1. Therefore, the present invention, as practiced in Example 2, results in a significant improvement in catalytic activity of activated low-temperature carbonaceous chars as compared to conventionally prepared chars as practiced in Example 1.

Example 3

The bituminous coal and 4% by weight pitch of Example 1 were combined with 10 weight % melamine. The resultant mixture was then processed in the manner described in Example 1. The t-¾ time and Iodine Number of the resultant low-temperature activated carbonaceous char were then determined according to the test methods described in Example 1. The results are provided in Table 1. As shown in Table 1, the Iodine Number of the low-temperature activated char of Example 3 is almost equal to Example 1 which indicates that the physical adsorption properties of all three chars are very similar. Also, comparison of the t-¾ time of the low-temperature activated char of Example 3 to that of Example 1 as given in Table 1 shows that the catalytic activity of the char of Example 3 is much greater (i.e. lower t-¾ time) than that of Example 1. Therefore, the present invention results in a significant improvement in catalytic activity of activated low-temperature carbonaceous chars as compared to conventionally prepared chars. Also, the test results show that melamine is as effective as urea in the practice of the present invention.

TABLE 1

| Sample | Iodine No., mg/g | t-¾, minutes |
| --- | --- | --- |
| activated char of Example 1 | 941 | 9.3 |
| activated char of Example 2 | 929 | 2.8 |
| activated char of Example 3 | 932 | 2.8 |

Example 4

A bituminous coal, 4% (by weight) pitch, and 4% (by weight) ammonium sulfate were pulverized and subsequently briquetted. The briquettes were crushed and sized to approximately less than 6 mesh size and greater than 20 mesh size (U.S. Standard Series sieves). A portion of this material was heated in the presence of large quantities of excess air from 200° C. to 450° C. at a rate of 1000° C./hour. The oxidized carbonized product was then activated at a temperature of approximately 1000° C. The resultant activated low-temperature carbonaceous char was then cooled to room temperature under inert conditions. The t-¾ time and Iodine Number were then determined according to the test methods described in Example 1. The results are given in Table 2.

Example 5

A second portion of the sized material of Example 4 was heated in the presence of 20 large quantities of excess air from 200° C. to 450° C. at a rate of 50° C./hour. Because of the difference in heating rates, the air exposure was double that of Example 4. All other conditions were the same. Therefore the carbonized product is more highly oxidized than the oxidized/carbonized product of Example 4. The oxidized carbonized product was then activated at a temperature of approximately 1000° C. The resultant activated low-temperature carbonaceous char was then cooled to room temperature under inert conditions. As shown in Table 2, the Iodine Number of the low-temperature activated chars of both examples are almost equal which implies that the physical adsorption properties of both chars are very similar. Also, the t-¾ time of the product of Example 5 is lower (i.e. higher catalytic activity) than the product of Example 4. Therefore, the requisite oxidation of the present invention is shown to have a significant effect on the development of catalytic activity of the resultant activated low-temperature activated carbonaceous char. This example also shows that the resultant catalytic activities (as evidenced by the t-¾ times) of the activated low-temperature carbonaceous chars of the present invention are dependent on, and increase with, the extent of oxidation.

TABLE 2

| Sample | Iodine No., mg/g | t-¾, minutes |
| --- | --- | --- |
| activated char of Example 4 | 1,131 | 16.9 |
| activated char of Example 5 | 1,126 | 6.0 |

Example 6

A subituminous coal was sized to approximately less than 6 mesh size and greater than 20 mesh size (U.S. Standard Series sieves). In the presence of large quantities of excess air, the formed and sized material was oxidized and carbonized by heating from 100° C. to 200° C. at 200° C./hour, 200° C. to 250° C. at 33° C./hour, 250° C. for 4.5 hour, 250° C. to 450° C. at 200° C./hour. The oxidized carbonized product was activated at a temperature of approximately 1000° C. The resultant activated low-temperature carbonaceous char was then cooled to room temperature under inert conditions. The t-¾ time and Iodine Number of the resultant activated low-temperature carbonaceous char were determined according to the test methods described in Example 1. The results are provided in Table 3.

Example 7

The subituminous coal of Example 6 was sized according to the manner described in Example 6. The resultant sized material was then combined with an aqueous solution of urea and then dried at 105° C. The resultant dried material contained approximately 8% by weight urea. The resultant impregnated material was then thermally processed in the same manner described in Example 6. The t-¾ time and Iodine Number of the resultant activated low-temperature activated carbonaceous char were determined according to the test methods described in Example 1. The results are given in Table 3. As shown in Table 3, the Iodine Number of the activated low-temperature char of Example 7 is almost equal to that of Example 6 which indicates that the physical adsorption properties of both chars are very similar. Also, comparison of the t-¾ time of the activated low-temperature char of Example 7 to that of Example 6 as provided in Table 3 shows that the catalytic activity of the char of Example 7 is much greater (i.e. lower t-¾ time) than that of Example 6. Therefore, the present invention, as practiced in Example 7, results in a significant improvement in catalytic activity of activated low-temperature carbonaceous char as compared to the conventionally prepared char of Example 6.

TABLE 3

| Sample | Iodine No., mg/g | t-¾, minutes |
| --- | --- | --- |
| activated char of Example 6 | 569 | 33.7 |
| activated char of Example 7 | 561 | 9.7 |

Example 8

Lignite coal was sized to approximately less than 6 mesh size and greater than 20 mesh size (U.S. Standard Series sieves). In the presence of large quantities of excess air, the formed and sized material was oxidized and carbonized by heating from 100° C. to 200° C. at 200° C./hour, 200° C. to 250° C. at 33° C./hour, 250° C. for 4.5 hour, 250° C. to 450° C. at 200° C./hour. The oxidized carbonized product was then activated at a temperature of approximately 1000° C. The resultant activated low-temperature carbonaceous char was then cooled to room temperature under inert conditions. The t-¾ time and Iodine Number of the resultant activated low-temperature carbonaceous char were determined according to the test methods described in Example 1. The results are provided in Table 4.

Example 9

The lignite coal of Example 8 was sized according to the manner described in Example 8. The resultant sized material was then combined with an aqueous solution of urea and then dried at 105° C. The resultant dried material contained approximately 8% by weight urea. The resultant dried material was then thermally processed in the manner described in Example 8. The t-¾ time and Iodine Number of the resultant activated low-temperature carbonaceous char were determined according to the test methods described in Example 1 and are given in Table 4. As shown in Table 4, the Iodine Number of the activated low-temperature char of Example 9 is almost equal to that of Example 8 which implies that the physical adsorption properties of both chars are very similar. Also, comparison of the t-¾ time of the activated low-temperature char of Example 9 to that of Example 8 as given in Table 4 shows that the catalytic activity of the char of Example 9 is much greater (i.e. lower t-¾ time) than that of Example 8. Therefore, the present invention results in a significant improvement in catalytic activity of activated low-temperature carbonaceous chars, as exemplified in Example 9, as compared to conventionally prepared chars, as exemplified in Example 8.

TABLE 4

| Sample | Iodine No., mg/g | t-¾, minutes |
| --- | --- | --- |
| activated char of Example 8 | 254 | 64.5 |
| activated char of Example 9 | 252 | 24.6 |

Example 10

An anthracite coal and 19% (by weight) binders were pulverized. The resultant pulverized material was combined with water and formed into pellets with approximately 4 mm diameter. In the presence of large quantities of excess air, the pelleted material was oxidized and carbonized by heating from 80° C. to 300° C. at 132° C./hour, 300° C. to 480° C./ at 108° C./hour, and then maintaining the temperature at 480° C. for 0.8 hour. The oxidized carbonized product was then activated at a temperature of approximately 1000° C. The resultant activated low-temperature carbonaceous char was then cooled to room temperature under inert conditions. The t-¾ time and Iodine Number of the resultant activated low-temperature carbonaceous char were determined according to the test methods described in Example 1. The results are shown in Table 5.

Example 11

The pulverized mixture of anthracite coal and binders of Example 10 were combined with water and urea and formed into pellets with approximately 4 mm diameter. The urea content of the resultant pelleted material was 6.6% by weight. The pelleted material was subjected to the thermal processing as described in Example 10. The resultant activated low-temperature carbonaceous char was then cooled to room temperature under inert conditions. The t-¾ time and Iodine Number of the resultant activated low-temperature carbonaceous char were determined according to the test methods described in Example 1. The results are shown in Table 5. As shown in Table 5, the Iodine Numbers of the activated low-temperature chars of Examples 11 and 12 are almost equal, which indicates that the physical adsorption properties of both chars are very similar. Also, comparison of the t-¾ time of the high-temperature activated char of Example 11 to that of Example 10 shows that the catalytic activity of the char of Example 11 is much greater (i.e. lower t-¾ time) than that of Example 10. Therefore, the present invention results in a significant improvement to the catalytic activity of an activated low-temperature carbonaceous char (Example 11) as compared to conventionally prepared char (Example 10) when the feedstock is anthracite coal. Furthermore, it is observed that this significant improvement can be obtained with other than granular materials.

TABLE 5

| Sample | Iodine No., mg/g | t-¾, minutes |
| --- | --- | --- |
| activated char of Example 10 | 968 | 106 |
| activated char of Example 11 | 965 | 22.2 |

Example 12

A bituminous coal and 4% (by weight) pitch were pulverized and subsequently briquetted. The resultant briquettes we re crushed and sized to approximately less than 6 mesh size and greater than 20 mesh size (U.S. Standard Series sieves). In the presence of large quantities of excess air, the formed and sized material was oxidized and carbonized by heating from 200° C. to 450° C. at a rate of 50° C./hour and maintaining the temperature at 450° C. for two additional hours. The oxidized carbonized product was activated at a temperature of approximately 1000° C. The resultant activated low-temperature carbonaceous char was then cooled to room temperature under inert conditions. The t-¾ time and Iodine Number of the resultant activated low-temperature carbonaceous char were determined according to the test methods described in Example 1 and are provided in Table 6.

Example 13

The bituminous coal and 4% (by weight) pitch of Example 12 were combined with 8% (by weight) of toluene di-isocyanate resin. The resin is a nitrogen-containing compound having a nitrogen functionality in which the nitrogen exhibits an oxidation number of less than zero. The resultant mixture was then processed in the manner described in Example 12. The t-¾ time and Iodine Number of the resultant activated low-temperature carbonaceous char were determined according to the test methods described in Example 12 and are provided in Table 6. As shown in Table 6, the Iodine Number of the activated low-temperature activated char of Example 13 is almost equal to that of Example 12 which indicates that the physical adsorption properties of both chars are very similar. Also, comparison of the t-¾ time of the high-temperature activated char of Example 13 to that of Example 12 as set forth in Table 6 shows that the catalytic activity of the char of Example 13 is much greater (i.e. lower t-¾ time) than that of Example 12. Therefore, the present invention results in a significant improvement in catalytic activity of activated low-temperature carbonaceous chars, as exemplified by Example 13, as compared to conventionally prepared chars, as exemplified by Example 12.

TABLE 6

| Sample | Iodine No., mg/g | t-¾, minutes |
|---|---|---|
| activated char of Example 12 | 844 | 7.1 |
| activated char of Example 13 | 870 | 3.2 |

While presently preferred embodiments of the invention have been described in detail, the invention may be otherwise embodied with in the scope of the appended claims.

Example 14

A bituminous coal and 4 weight % pitch were pulverized and subsequently briquetted. The resultant briquettes were crushed and sized to approximately less than 6 mesh size and greater than 20 mesh size (U.S. Standard Series sieves). In the presence of large quantities of excess air, the formed and sized material was oxidized and carbonized by heating from 150° C. to 450° C. at a rate of 150° C./hour and maintaining the temperature at 450° C. for two additional hours. The oxidized carbonized product was then cooled, impregnated with an aqueous solution of urea, and then dried in a manner similar to that of Example 2 of U.S. Pat. No. 5,504,050. The resultant dried material contained approximately 7% by weight urea. The resultant urea-impregnated material was then activated at a temperature of approximately 1000° C. and then cooled to room temperature under inert conditions. The t-¾ time. of the resultant char was then determined according to the method of Example 1 of U.S. Pat. No. 5,470,748. The Iodine Number of the same char was also determined according to Test Method number TM4, Calgon Carbon Corporation, Pittsburgh, Pa. The results 1; are given in Table 7.

Example 15

The bituminous coal and 4 weight % pitch of Example 14 were combined with 10 weight % urea and subsequently briquetted. The resultant briquettes were crushed and sized to approximately less than 6 mesh size and greater than 20 mesh size (U.S. Standard Series sieves). The resultant formed and sized material was then oxidized and carbonized, then urea impregnated and dried, then activated and cooled in the manner described in Example 14. The t-¾ time and Iodine Number of the resultant activated low-temperature carbonaceous char were then determined according to the test methods described in Example 14. The results are provided in Table 7. As shown in Table 7, the Iodine Number of the activated low-temperature char of Example 15 is comparable to that given in Example 14 which indicates that the physical adsorption properties of the two chars are very similar. Also, the catalytic activity of the char of Example 14 is high, as evidenced by the t-¾ time. However, comparison of the t-¾ time of the activated low-temperature char of Example 15 to that of Example 14 as given in Table 7 shows that the catalytic activity of the char of Example 15 is even greater (i.e., lower t-¾ time) than that of Example 14. Therefore, the present invention, when practiced in combination with prior art methods that produce catalytically active chars, provides for higher catalytic activity than would otherwise result in the absence of the invention.

TABLE 7

|  | Iodine No., mg/g | t-¾, minutes |
|---|---|---|
| activated char of Example 14 | 938 | 7.5 |
| activated char of Example 15 | 895 | 5.1 |

What is claimed is:

1. A process for the production of an activatable catalytic carbonaceous char which comprises the steps of (a) mixing together a nitrogen-containing compound or material with a carbon-containing material to produce a mixture wherein said nitrogen-containing compound or material contains more nitrogen than said carbon-containing material, said carbon-containing material provides more carbon to said mixture than said nitrogen-containing compound or material provides to said mixture, and said nitrogen-containing compound or material consists of nitrogen and at least one of the group consisting of carbon, hydrogen, oxygen, sulfur, fluorine, chlorine, bromine and iodine, (b) carbonizing said mixture at temperatures less than 600° C., and (c) oxidizing said carbonized mixture after said carbonizing at temperatures less than 600° C. to provide an activatable catalytic char.

2. A process for the production of an activatable catalytic carbonaceous char which comprises the steps of (a) mixing together a nitrogen-containing compound or material with a carbon-containing material to produce a mixture wherein nitrogen than said carbon-containing material, said carbon-containing material provides more carbon to said mixture than said nitrogen-containing compound or material provides to said mixture, and said nitrogen-containing compound or material consists of nitrogen and at least one of the group consisting of carbon, hydrogen, oxygen, sulfur, fluorine, chlorine, bromine and iodine, and (b) carbonizing and oxidizing said mixture at a temperatures less than about 600° C. to provide an activatable catalytic char.

3. The process of claim 1 or 2 wherein said oxidizing is accomplished electrochemically.

4. The process of claim 1 or 2 wherein said carbon-containing material is coal.

5. The process of claim 1 or 2 wherein said oxidizing is accomplished with any oxidizing agent containing oxygen.

6. The process of claim 1 or wherein said nitrogen-containing compound or material is ammonia, urea, melamine, or any other nitrogen-containing compound, exclusively or in any combination, in which at least one nitrogen functionality has a normal oxidation number less than zero.

7. The process of claim 1 or wherein said nitrogen-containing compound or material is an ammonium salt.

8. The process of claim 1 or wherein the said nitrogen-containing compound or material contains an amine, amide, nitrile, nitrosamine, cyanate, isocyanate, or oxime functional group, exclusively or in any combination or as part of a polymer.

9. The process of claim 1 or wherein said nitrogen-containing compound or material is combined with other compounds or materials containing substantially no nitrogen.

10. A process as set forth in claim 1 or 2 including the step of increasing the temperature of the low-temperature catalytic char to above 600° C. to provide an activated low-temperature catalytic carbonaceous char.

11. The process of claim 10 including activating said low-temperature catalytically active carbonaceous char at temperatures above 600° C. in the presence of $H_2O$, $CO_2$, or $O_2$ or combinations thereof to provide an activated catalytically active carbonaceous char.

12. The process of claim 10 including the step of cooling said catalytically active carbonaceous char to temperatures less than 400° C. under substantially oxygen-free or otherwise inert atmosphere.

13. A process as set forth in claim 1 or 2 including the step of impregnation of the low-temperature catalytic char with a nitrogen-containing compound or material then increasing the temperature of the low-temperature catalytic char to above 600° C. to provide an activated low-temperature catalytically active carbonaceous char.

14. The process of claim 13 including activating said low-temperature catalytically active carbonaceous char at temperatures above 600° C. in the presence of $H_2O$, $CO_2$, or $O_2$ or combinations thereof to provide an activated catalytically active carbonaceous char.

15. The process of claim 13 including the step of cooling said catalytically active carbonaceous char to temperatures less than 400° C. under substantially oxygen-free or otherwise inert atmosphere.

16. The process of claim 13 wherein said nitrogen-containing compound or material is ammonia, urea, melamine, or any other nitrogen-containing compound, exclusively or in any combination, in which at least one nitrogen functionality has a formal oxidation number less than zero.

17. The process of claim 13 wherein said nitrogen-containing compound or material is an ammonium salt.

18. The process of claim 13 wherein said nitrogen-containing compound or material contains an amine, amide, nitrile, nitrosamine, cyanate, isocyanate, or oxime functional group, exclusively or in any combination or as part of a polymer.

19. The process of claim 13 wherein said nitrogen-containing compound or material is combined with other compounds or materials containing substantially no nitrogen.

20. The process of claim 11 including the step of cooling said catalytically active carbonaceous char to temperatures less than 400° C. under substantially oxygen-free or otherwise inert atmosphere.

21. A process for the production of a catalytically activatable carbonaceous char which comprises the steps of (a) mixing together a nitrogen-containing compound or material with a carbon-containing material to produce a mixture, (b) carbonizing said mixture at temperatures less than 600° C. and (c) oxidizing said carbonized mixture after said carbonizing at temperatures less than 600° C. to provide an activatable low-temperature catalytic char wherein said oxidizing is accomplished electrochemically.

22. A process for the production of a catalytically activatable carbonaceous char which comprises the step of (a) mixing together a nitrogen-containing compound or material and with a carbon-containing material to produce a mixture, (b) carbonizing and oxidizing said mixture at a temperature less than about 600° C. to provide an activatable low-temperature catalytic char wherein said oxidizing is accomplished electrochemically.

* * * * *

UNITED STATES PATENT AND TRADEMARK OFFICE
CERTIFICATE OF CORRECTION

PATENT NO.    : 6,342,129 B1
DATED         : January 29, 2002
INVENTOR(S)   : Vaughn et al.

It is certified that error appears in the above-identified patent and that said Letters Patent is hereby corrected as shown below:

Column 10,
Lines 53 and 55, please delete the period after "C"

Column 11,
Line 2, please delete the period after "C"
Lines 9, 15, 17 and 22, please insert -- 2 -- after "1 or"
Lines 28 and 32, please delete the period after "C"
Line 33, please delete "thereof" and insert therefore -- hereof --
Lines 37, 43 and 47, please delete the period after "C"

Column 12,
Lines 5, 27, 33, 35 and 43, please delete the period after "C"

Signed and Sealed this

Twenty-second Day of July, 2003

JAMES E. ROGAN
*Director of the United States Patent and Trademark Office*